US012755045B1

(12) United States Patent
Scotney et al.

(10) Patent No.: US 12,755,045 B1
(45) Date of Patent: Oct. 6, 2026

(54) SEARCHABLE UTILITY SYSTEM FOR ENCRYPTED CONTENT

(71) Applicant: StratoKey Pty Ltd., Hobart (AU)

(72) Inventors: Anthony Scotney, Hobart (AU); Sabyasachi Routray, Hobart (AU)

(73) Assignee: StratoKey Pty Ltd., Hobart (AU)

( * ) Notice: Subject to any disclaimer, the term of this patent is extended or adjusted under 35 U.S.C. 154(b) by 531 days.

(21) Appl. No.: 18/082,390

(22) Filed: Dec. 15, 2022

(51) Int. Cl.

| | |
|---|---|
| ***G06F 16/60*** | (2019.01) |
| ***G06F 16/9032*** | (2019.01) |
| ***G06F 16/9532*** | (2019.01) |
| ***G06F 21/62*** | (2013.01) |

(52) U.S. Cl.
CPC .... *G06F 21/6227* (2013.01); *G06F 16/90324* (2019.01); *G06F 16/9532* (2019.01)

(58) Field of Classification Search
CPC ............. G06F 16/7227; G06F 16/9532; G06F 16/90324
See application file for complete search history.

(56) References Cited

U.S. PATENT DOCUMENTS 6,829,638 B1 12/2004 McBrearty
7,788,407 B1 8/2010 Venkat
8,437,744 B1 5/2013 Heins
8,566,247 B1 10/2013 Nagel
8,688,727 B1 * 4/2014 Das .................. G06F 16/24575 707/766
8,768,307 B1 7/2014 Heins
9,076,004 B1 7/2015 Bogorad
9,197,673 B1 11/2015 Gaddy
9,544,636 B2 1/2017 Laska et al.
9,734,169 B2 8/2017 Redlich et al.
9,794,061 B1 10/2017 Bushman
9,910,745 B1 3/2018 Lukkoor
9,953,309 B2 4/2018 Carlson
10,313,520 B2 6/2019 Dwyer et al.
10,360,243 B2 7/2019 Ukai
10,372,926 B1 8/2019 Leshinsky
10,447,710 B1 10/2019 Li
10,594,721 B1 3/2020 Scotney
(Continued)

FOREIGN PATENT DOCUMENTS

CN 101398871 A 4/2009

OTHER PUBLICATIONS

Web-Archive Page entitled "StratoKey White Paper", by StratoKey, dated Sep. 28, 2021, available at https://web.archive.org/web/20210928173857/https:/www.stratokey.com/resources/stratokey-white-paper (Year: 2021).*
(Continued)

*Primary Examiner* — Mahesh H Dwivedi
(74) *Attorney, Agent, or Firm* — Mahamedi IP Law LLP

(57) ABSTRACT

A searchable utility system can receive, over one or more networks, search text from a SaaS application executing on a client device of a user. The system can parse the search text to determine a set of search parameters for obtaining a set of encrypted counterparts for the search text. The system can further generate a modified search term based on the search text and the set of search parameters, and provide, over the one or more networks, the modified search term to the client device of the user to cause the SaaS application to execute a search using the modified search term.

20 Claims, 6 Drawing Sheets

(56) References Cited

U.S. PATENT DOCUMENTS

| | | | | |
|---|---|---|---|---|
| 10,798,064 | B1 | 10/2020 | Scotney | |
| 10,826,946 | B2 | 11/2020 | Bykampadi | |
| 10,880,322 | B1 | 12/2020 | Jakobsson | |
| 10,936,751 | B1 | 3/2021 | Scotney | |
| 10,963,590 | B1 | 3/2021 | Dash | |
| 11,042,506 | B2 | 6/2021 | Aksionkin | |
| 11,087,225 | B2 | 8/2021 | Nickl et al. | |
| 11,089,126 | B1 | 8/2021 | Scotney | |
| 11,394,710 | B1 | 7/2022 | Royal et al. | |
| 11,416,874 | B1 | 8/2022 | Scotney | |
| 11,503,067 | B2 | 11/2022 | Kras | |
| 11,783,349 | B2 | 10/2023 | Scotney | |
| 2002/0128925 | A1 | 9/2002 | Angeles | |
| 2003/0079120 | A1 | 4/2003 | Hearn | |
| 2003/0200331 | A1 | 10/2003 | Mahajan | |
| 2004/0024826 | A1 | 2/2004 | Halahmi | |
| 2005/0132286 | A1 | 6/2005 | Rohrabaugh | |
| 2006/0004719 | A1 | 1/2006 | Lawrence | |
| 2006/0149590 | A1 | 7/2006 | Palmer | |
| 2006/0253594 | A1 | 11/2006 | Szabo | |
| 2007/0300057 | A1 | 12/2007 | Corcoran | |
| 2008/0147637 | A1* | 6/2008 | Li | G06F 16/3338 707/999.005 |
| 2008/0301805 | A1 | 12/2008 | Bharara | |
| 2009/0063952 | A1 | 3/2009 | Raghavachari | |
| 2009/0217354 | A1 | 8/2009 | Blum | |
| 2010/0071052 | A1 | 3/2010 | Mao | |
| 2010/0088389 | A1 | 4/2010 | Buller | |
| 2010/0198917 | A1 | 8/2010 | Petersen | |
| 2012/0030294 | A1 | 2/2012 | Piermot | |
| 2012/0117458 | A1 | 5/2012 | Holloway | |
| 2012/0143968 | A1 | 6/2012 | Oren | |
| 2012/0179787 | A1 | 7/2012 | Walsh | |
| 2012/0324113 | A1 | 12/2012 | Prince | |
| 2013/0346453 | A1 | 12/2013 | Procopio | |
| 2014/0006357 | A1 | 1/2014 | Davis | |
| 2014/0046906 | A1 | 2/2014 | Patiejunas | |
| 2014/0095865 | A1 | 4/2014 | Yerra | |
| 2014/0122866 | A1 | 5/2014 | Haeger | |
| 2014/0129457 | A1 | 5/2014 | Peeler | |
| 2014/0229729 | A1 | 8/2014 | Roth | |
| 2014/0245389 | A1 | 8/2014 | Oberheide et al. | |
| 2014/0282936 | A1 | 9/2014 | Fitzgerald | |
| 2014/0337614 | A1 | 11/2014 | Kelson | |
| 2014/0373177 | A1* | 12/2014 | Arning | G06F 21/604 726/28 |
| 2015/0006890 | A1 | 1/2015 | Roth | |
| 2015/0039887 | A1 | 2/2015 | Kahol | |
| 2015/0067881 | A1 | 3/2015 | Badstieber | |
| 2015/0249684 | A1 | 9/2015 | Zhang | |
| 2015/0278545 | A1 | 10/2015 | Bigras | |
| 2016/0004729 | A1 | 1/2016 | Evans | |
| 2016/0019224 | A1 | 1/2016 | Ahn | |
| 2016/0087933 | A1 | 3/2016 | Johnson | |
| 2016/0171227 | A1 | 6/2016 | Margolin | |
| 2016/0217269 | A1 | 7/2016 | Goettges | |
| 2016/0226844 | A1 | 8/2016 | Pecka | |
| 2016/0234209 | A1 | 8/2016 | Kahol | |
| 2016/0234330 | A1 | 8/2016 | Popowitz | |
| 2016/0261668 | A1 | 9/2016 | Joel | |
| 2016/0269371 | A1 | 9/2016 | Coimbatore | |
| 2017/0034100 | A1 | 2/2017 | Zink | |
| 2017/0104723 | A1 | 4/2017 | Merrit | |
| 2017/0132331 | A1* | 5/2017 | Pepakayala | G06F 16/24575 |
| 2017/0201526 | A1 | 7/2017 | Yehuda | |
| 2017/0223003 | A1 | 8/2017 | Miles | |
| 2017/0236129 | A1 | 8/2017 | Kholkar | |
| 2017/0242913 | A1* | 8/2017 | Tijssen | G06F 40/279 |
| 2017/0243028 | A1 | 8/2017 | LaFever | |
| 2017/0286437 | A1 | 10/2017 | Stevens | |
| 2017/0300560 | A1* | 10/2017 | Nugent | G06F 3/04842 |
| 2018/0025011 | A1 | 1/2018 | Aksionkin | |
| 2018/0063117 | A1 | 3/2018 | Tseng | |
| 2018/0081893 | A1* | 3/2018 | Juneja | G06F 16/9038 |
| 2019/0236283 | A1 | 8/2019 | Koster | |
| 2019/0286850 | A1 | 9/2019 | Popescu | |
| 2020/0019552 | A1* | 1/2020 | Deng | G06F 16/24542 |
| 2020/0065523 | A1 | 2/2020 | Fukuda | |
| 2020/0073940 | A1 | 3/2020 | Grosset | |
| 2020/0084211 | A1 | 3/2020 | Wang | |
| 2020/0175484 | A1 | 6/2020 | Kumar | |
| 2020/0213345 | A1 | 7/2020 | Scotney | |
| 2020/0236187 | A1 | 7/2020 | Tal | |
| 2020/0336514 | A1* | 10/2020 | Momchilov | H04L 67/02 |
| 2021/0004425 | A1* | 1/2021 | Gu | H04L 63/0815 |
| 2021/0021573 | A1 | 1/2021 | Scotney | |
| 2021/0344770 | A1 | 11/2021 | Scotney | |
| 2022/0019695 | A1 | 1/2022 | Scotney | |
| 2022/0400016 | A1 | 12/2022 | Tadepalli et al. | |
| 2023/0014970 | A1 | 1/2023 | Gujarathi et al. | |
| 2023/0222117 | A1* | 7/2023 | Garg | G06F 16/242 707/769 |
| 2024/0205016 | A1* | 6/2024 | Mc Brearty | H04L 9/002 |
| 2025/0097202 | A1 | 3/2025 | Scotney | |

OTHER PUBLICATIONS

Web-Archive Page entitled "Cloud Access Security Brokers (CASB)", by StratoKey, dated Oct. 19, 2021, available at https://web.archive.org/web/20211019123908/https:/www.stratokey.com/solutions/cloud-access-security-brokers (Year: 2021).*

"Flashproxy: Transparently Enabling Rich Web Content via Remote Execution", Jun. 17-20, 2008, MobiSys'08, Breckenridge, Colorado, USA, retrieved from http://citeseerx.ist.psu.edu/viewdoc/download;jsessionid= 159110DAEE75CBDD05764EBEC094321D?doi=10.1.1.143.6717&rep=rep1 &type=pdf on Mar. 11, 2021. (Year: 2008) 13 Pages.

Linh et al. Compliance monitoring in business processes: Functionalities, application and tool-support. Information Systems. vol. 54. Dec. 2015. pp. 209-234. https://www.sciencedirect.com/science/article/pii/S0306437915000459 (Year: 2015).

* cited by examiner

SEARCHABLE UTILITY SYSTEM FOR ENCRYPTED CONTENT

BACKGROUND

Encryption algorithms aim to make content unpredictable and unrelated to the actual underlying plain text. Different types of encryption algorithms can encrypt content in a non-deterministic manner, such that partial content searches are problematic.

BRIEF DESCRIPTION OF THE DRAWINGS

The disclosure herein is illustrated by way of example, and not by way of limitation, in the figures of the accompanying drawings in which like reference numerals refer to similar elements, and in which.

DETAILED DESCRIPTION

Figure 1:
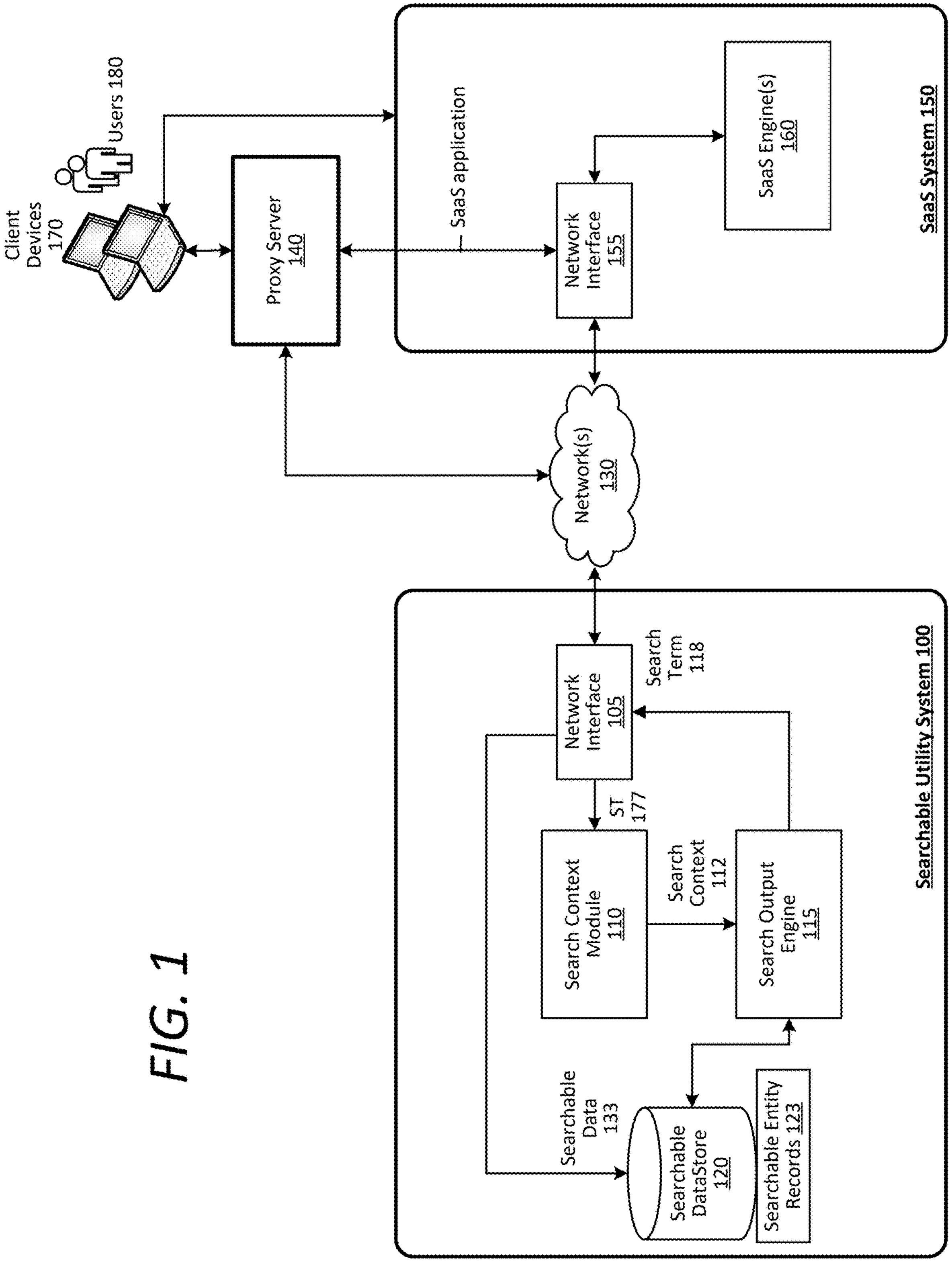
FIG. 1 is a block diagram illustrating an example searchable utility system, in accordance with examples described herein.

Non-deterministic encryption can produce different encrypted outputs for a given plaintext, whereas deterministic encryption always produces the same encrypted output for a given plaintext. Because non-deterministic encryption produces different encrypted outputs, there is a current inability to search with non-deterministic content. In certain approaches, searchable content may be encrypted with a fixed deterministic encryptor. At the configuration level, searchable text can be encrypted in this manner to allow an application (e.g., a software-as-a-service (SaaS) application) to perform searches with the encrypted term. However, this approach is quite restrictive since it does not support searches for all encryptions. For example, partial or wildcard searches (e.g., in which special characters stand in for unknown characters in a text value) are not supported in fixed deterministic encryption, and compatibility for searching both the encrypted and non-encrypted forms of the search text are also not supported. Furthermore, using fixed deterministic encryption weakens encryption strength due to increased predictability of the encrypted content in relation to using other, stronger encryption methods.

According to examples described herein, a searchable utility system can communicate with an application to provide a solution for searching with non-encrypted text to find all encrypted values of the search text (e.g., partial, whole, and wildcard values) and generate a corresponding modified search term for the application that yields all encrypted results. In various implementations, the searchable utility system does not perform the search by itself. Specifically, the searchable utility system can update the search text and/or criteria for the hosting SaaS application to help generate an output with both encrypted and non-encrypted data. In further examples, the searchable utility system can store the real text values and their encrypted equivalents for content that is expected to be searchable. The searchable utility system can comprise a configuration engine that captures and uses the search text to find its matching encrypted texts. Using both the search text and the encrypted texts, the searchable utility system can generate a final search term, which can comprise the search tokens and encrypted search tokens joined together (e.g., via a Boolean 'OR' operator).

As an example, for the search text of 'John,' the searchable utility system can find that the words matched are 'John,' 'Johny,' and 'Johnston.' The system can further find the encrypted forms for these matched words as, for example, '<Encrypted_John>,' '<Encrypted_Johny>,' and '<Encrypted_Johnston>.' These encrypted tokens can comprise whole words as opposed to partial matches, so for common applications, the system can enclose a search term within quotation marks to generate an exact match. The result is four search tokens comprising John, "<Encrypted_John>", "<Encrypted_Johny>", and "<Encrypted_Johnston>", which the system automatically joins together (e.g., via the Boolean 'OR' operator) to generate the final search term for presenting search results.

Examples described herein solve technical problems relating to the inability to make encrypted content searchable, or the requirement of weakened and/or more predictable encryption methods in order to make encrypted content searchable. The searchable utility engine described herein solves these technical problems by capturing, at the configuration level, the matching encrypted texts to a given search text, and automatically generating a set of search tokens that are joined to encompass a final search term that yields all search results for the encrypted search term. As provided herein, the search results can further include the search results for partial searches, wildcards and regular expression-based \ searches.

As used herein, a computing device refers to devices corresponding to desktop computers, cellular devices or smartphones, personal digital assistants (PDAs), laptop computers, virtual reality (VR) or augmented reality (AR) headsets, tablet devices, television (IP Television), etc., that can provide network connectivity and processing resources for communicating with the system over a network. A computing device can also correspond to custom hardware, in-vehicle devices, or on-board computers, etc. The computing device can also operate a designated application configured to communicate with the network service.

One or more examples described herein provide that methods, techniques, and actions performed by a computing device are performed programmatically, or as a computer-implemented method. Programmatically, as used herein, means through the use of code or computer-executable instructions. These instructions can be stored in one or more memory resources of the computing device. A programmatically performed step may or may not be automatic.

One or more examples described herein can be implemented using programmatic modules, engines, or components. A programmatic module, engine, or component can include a program, a sub-routine, a portion of a program, or a software component or a hardware component capable of performing one or more stated tasks or functions. As used herein, a module or component can exist on a hardware component independently of other modules or components. Alternatively, a module or component can be a shared element or process of other modules, programs or machines.

Some examples described herein can generally require the use of computing devices, including processing and memory resources. For example, one or more examples described herein may be implemented, in whole or in part, on computing devices such as servers, desktop computers, cellular or smartphones, personal digital assistants (e.g., PDAs), laptop computers, VR or AR devices, printers, digital picture frames, network equipment (e.g., routers) and tablet devices. Memory, processing, and network resources may all be used in connection with the establishment, use, or performance of any example described herein (including with the performance of any method or with the implementation of any system).

Furthermore, one or more examples described herein may be implemented through the use of instructions that are executable by one or more processors. These instructions may be carried on a computer-readable medium. Machines shown or described with figures below provide examples of processing resources and computer-readable mediums on which instructions for implementing examples disclosed herein can be carried and/or executed. In particular, the numerous machines shown with examples of the invention include processors and various forms of memory for holding data and instructions. Examples of computer-readable mediums include permanent memory storage devices, such as hard drives on personal computers or servers. Other examples of computer storage mediums include portable storage units, such as CD or DVD units, flash memory (such as carried on smartphones, multifunctional devices or tablets), and magnetic memory. Computers, terminals, network enabled devices (e.g., mobile devices, such as cell phones) are all examples of machines and devices that utilize processors, memory, and instructions stored on computer-readable mediums. Additionally, examples may be implemented in the form of computer-programs, or a computer usable carrier medium capable of carrying such a program.

System Description

FIG. 1 is a block diagram illustrating an example searchable utility system 100, in accordance with examples described herein. In various implementations, the searchable utility system 100 can include a network interface 105 to communicate, over one or more networks 130, with a SaaS system 150 that utilizes a search service for encrypted content implemented by the searchable utility system 100. In certain examples, the searchable utility system 100 can be implemented as a Representational State Transfer (REST) service (e.g., a web service) for managing searchable data for the SaaS system 150. As such, the network interface 105 may be implemented as a uniform interface for client devices 170 executing a SaaS application. In certain examples, the SaaS system 150 can be accessed by the users 180 via a proxy server 140 that functions as a gateway or intermediary between the client devices 170 and the SaaS system 150. In certain examples, the proxy server 140 can perform the functions of the REST system or work in conjunction with the REST system (e.g., serve as a REST interface to identify search text 177 and submit the search text 177 to the searchable utility system 100). As provided herein, the proxy server 140 can be an optional component. In alternative examples, the SaaS system 150 can be accessed by the users 180 directly.

In certain examples, the searchable utility system 100 can function as a data push service in which the SaaS system 150 sends wholly encrypted searchable data (e.g., to be configured and stored as searchable entity records 123) to the searchable utility system 100 (e.g., via the REST service). In such an example, the same REST service may be utilized for storing and updating the searchable entity records 123 in a searchable datastore 120 compiled by the searchable utility system 100, which can comprise encrypted data records each associated with a transformer identifier that can be utilized by a searchable data store 120 to form matching plaintext data for the searchable entity record 123. Accordingly, the searchable data 133 for a given plaintext term can be received from the SaaS system 150 along with the transformer identifier, which associates the searchable data 133 with the plaintext term in a searchable entity record 123 stored in a searchable datastore 120.

In various examples, the SaaS system 150 can comprise any third-party entity providing third-party software services for client entities, such as operations, enterprises, other corporate entities, and the like. The users 180 can comprise members (e.g., employees, contractors, associates, etc.) of the client entities, and can operate client devices 170 that execute a SaaS application, or access the SaaS service via a browser, that enables the searchable functions of encrypted content, as described throughout the present disclosure. In accordance with example described herein, the SaaS system 150 can generally provide software services (e.g., any SaaS function) for the users 180 using a set of SaaS engines 160 that implement the SaaS functions.

As provided herein, the searchable data 133 received from the SaaS system 150 does not contain any unencrypted data so as to maintain robust security. Thus, each searchable dataset 133 received from the SaaS system 150 is already encrypted before being stored in the searchable datastore 120. As described in further detail below, each searchable entity record 123 configured and stored in the searchable datastore 120 can include a root scope, unique identifier, and a generated token identifier, which can be encrypted deterministically by the searchable datastore 120 since this information is not inherently sensitive in nature and is used to maintain uniqueness in the searchable datastore 120.

In further examples, the REST service can include a data cancel service to enable the third-party entity to cancel a particular searchable entity record 123. For example, when the SaaS system 150 or the SaaS application requires deletion or deactivation of a searchable entity record 123, the SaaS system 150 can transmit a ‘cancel searchable entity record request’ via the REST service (e.g., over the one or more networks 150 via the network interfaces 105, 155), and the searchable datastore 120 can delete the searchable entity record 123 accordingly.

In various implementations, the searchable datastore 120 can comprise a collection of searchable entity records 123, each of which can be configured by the searchable datastore 120 to include a set of properties, such as a context type, root scope, unique identifier, and a set searchable data tokens. Each of the searchable data tokens can include a token identifier, token text (e.g., a non-encrypted value used for the search), and search text comprising the encrypted value to be sent to the SaaS application in modified search text. Further description of the searchable entity records 123 is provided below with respect to FIG. 2A.

The searchable utility system 100 can further include a search context module 110 that processes search text 177 received from the SaaS system 150 and/or the SaaS application executing on a client device 170 of a user 180. For example, the search context module 110 can execute a search condition parser to parse the search text 177. Based on the search text 177, the search context module 110 can generate search context 112 that includes the details of the search criteria. The search context 112 outputted by the search context module 110 can comprise a set of properties that include a context type, a result type, a search condition, and a search scope. Further description of an example search context 112 outputted by the search context module 110 is provided below with respect to FIG. 2B.

In various examples, the search context 112 can be processed by a search output engine 115, which applies the search context 112 on the searchable datastore 120 to obtain a set of search results based the search text 177. In certain examples, the search output engine 115 can further determine or obtain one or more matched words, search tokens, identifiers (e.g., the encrypted form of the plaintext search terms), and identifier tokens from the result type. The search output engine 115 can further determine or obtain a set of conditions to be used to match the searchable data, which in some examples can comprise a set of operators, regular expressions, and/or negations. For example, each word in the search text 177 can comprise a different search token, and the relation between adjacent search tokens can comprise a joiner operator, such as 'OR' or 'AND'.

In certain examples, the search output engine 115 can obtain the scope of the search, which restricts the search to specific record types and/or specific fields in the searchable datastore 120. In various examples, the search scope can be derived from the search text 177. Further, if no search scope is present, the search output engine 115 can configure global scope for the search. The search scope can be hierarchical, in that the search output engine 115 can match the root scopes and then match the data tokens. In further examples, the searchable utility system 100 can support searches with multi-level scopes using token identifiers and/or fields that can make the search filtering efficient, which can extend the capabilities described herein beyond a SaaS application.

Upon applying the above information parsed from the search context 112 and the search text 177, the search output engine 115 can retrieve the matching searchable entity record(s) 123 to generate a final presentable user interface. In doing so, the search output engine 115 modifies or rewrites the search text 177 with the matched encrypted terms from the searchable datastore 120 (e.g., as obtained from the matching searchable entity records 123) to generate a final search term 118 that enables the SaaS application to perform the actual search itself. It is contemplated that typical search engines support logical operators (e.g., Boolean 'AND' and 'OR' operators), so the final search term 118 generated by the search output engine 115 can comprise all the search tokens and encrypted search tokens joined together with, for example, an 'OR' operator.

Accordingly, as the user 180 inputs plaintext search terms into the client device, the search text 177 can be modified by the search output engine 115 using the search context 112 generated by the search context module 110 and the matching searchable entity records 123 as identified by the search output engine 115 based on applying the search context 112 over the searchable datastore 120. The result can comprise a modified search term 118 that includes the encrypted content, as stored in the searchable datastore 120, that corresponds to the search text 177 inputted by the user 180 via the SaaS application. The final search term 118 may comprise of a combination of the search tokens and encrypted search tokens associated with the inputted search text joined together (e.g., with one or more operators determined from the context type). The final search term 118 can be provided to the client device 170 to enable the SaaS application to execute the search.

In certain examples, the functions of the search context module 110, searchable datastore 120, and/or search output engine 115 can be performed as background operations in real-time, such that as the user 180 inputs the search text 177, the modified search term 118 is provided to the client device 170 in near real-time. As such, the user experience at the client device 170 is substantially similar to that of a typical SaaS search operation. For example, plaintext can be inputted by the user 180 into a textbox of a search engine (e.g., via the SaaS application), which can be automatically provided to the searchable utility system 100 as the search text 177. The searchable utility system 100 can, in real-time, output the modified search term 118 to the client device 170 to enable encrypted content searching by the client device 170 in order to yield encrypted content search results.

Searchable Entity Record

Figure 2A:
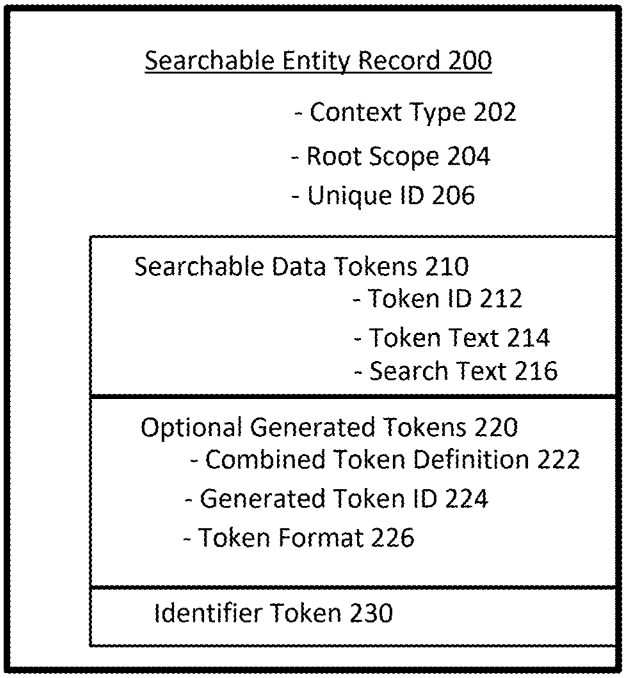
FIG. 2A illustrates an example searchable entity record generated by a searchable data store, in accordance with examples described herein.

FIG. 2A illustrates an example searchable entity record 200 stored in a searchable data store 120, in accordance with examples described herein. As provided herein, the searchable entity record 200 is a representation of an entity record at the SaaS application that is to be made searchable. In one example, the searchable entity record 200 is provided by the REST service or collected by the proxy server 140. In certain implementations, the searchable datastore 120 can receive encryption information associated with searchable plaintext from the SaaS system 150. In an example, the searchable datastore 120 can execute a configuration engine that prepares and processes the encryption information for a given search text into a searchable entity record 200. In doing so, the searchable datastore 120 can generate the searchable entity records 200 to include the real text values of plaintext search terms and their encrypted counterparts for any content that is expected to be searchable. Using both the search text and the encrypted texts, the searchable datastore 120 can include a set of properties of a searchable entity record 200.

Given a plaintext search term and corresponding encrypted equivalents, the searchable datastore 120 can collect the properties of the searchable entity record 123, which can include a context type 202, a root scope 204, and a unique identifier 206. In various example, these properties are encrypted (e.g., non-deterministically) prior to getting stored in the searchable datastore 120. The context type 202 can comprise an initial filter for the search (e.g., targeting a specific SaaS application or SaaS context), and the root scope 204 can designate the type of entity (e.g., whether the entity is a customer or an employee). In various examples, the searchable datastore 120 can further include a set of searchable data tokens 210 in the searchable entity record 200, each of which can include a token identifier 212 (e.g., the name of the token), token text 214 comprising the non-encrypted value used for the search, and search text 216 comprising the encrypted value(s) to be sent to the SaaS application for performing the modified search.

In further examples, the searchable datastore 120 can further include a set of optional generated tokens 220 in the searchable entity record 200. The set of optional generated tokens can hold a combined token definition 222 of other tokens which can be utilized to filter the search to one or more specific fields, and can further be used as an alias for other data tokens. An optional generated token 220 can have two properties including (i) a generated token identifier 224 comprising a unique identifier used for filtering the search to one or more specific fields, and (ii) a token format 226 that designates a combination of tokens (e.g., 'name' and 'fnmn-In' suggesting a generated token identifier of 'name' comprises a first name, middle name, and last name. In further examples, the searchable entity records 200 can include an identifier token 230 that can comprise either a normal data token or a generated data token. The identifier token 230 can be used for logging and as a search output.

As provided herein, the uniqueness of the searchable entity record 200 can be recognized by the record's context type 202, root scope 204, and unique identifier 206. Based on this information, the searchable datastore 120 can be virtually divided into individual datastores based on context types (e.g., a specific client datastore). In certain implementations, the searchable datastore 120 can further divide these individual context-based datastores into buckets or groups of entity types and/or scopes (e.g., a customer group, a case group, an employee group, and the like). In certain examples, these individual buckets or groups can include one entry for each unique identifier, such that when new data with an existing unique identifier is obtained, the searchable datastore 120 can replace the old data corresponding to the existing unique identifier with the new data. In further examples, the searchable datastore 120 can distribute the definition of the generated data tokens 220 across searchable entity records 200 of the same root scope 204 under the same context type 202.

As further provided herein, each searchable dataset 133 received by the searchable datastore 120 is encrypted before being stored in the datastore 120. In various examples, the encrypted content from the SaaS application is encrypted again with a separate encryption key. The data token identifier 212, the encrypted data, and the non-encrypted data can be stored after being encrypted non-deterministically, and the root scope 204, unique identifier 206, the generated token identifier 224, and the generated token format 226 can be encrypted by the searchable data store 120 deterministically, since none of these values contain sensitive information (e.g., they are used only to maintain uniqueness in the datastore 120). With such constraints, the searchable data is only available while the search service (e.g., REST service) is running, and only to the searchable utility system 100 to maintain robust security.

Search Context

Figure 2B:
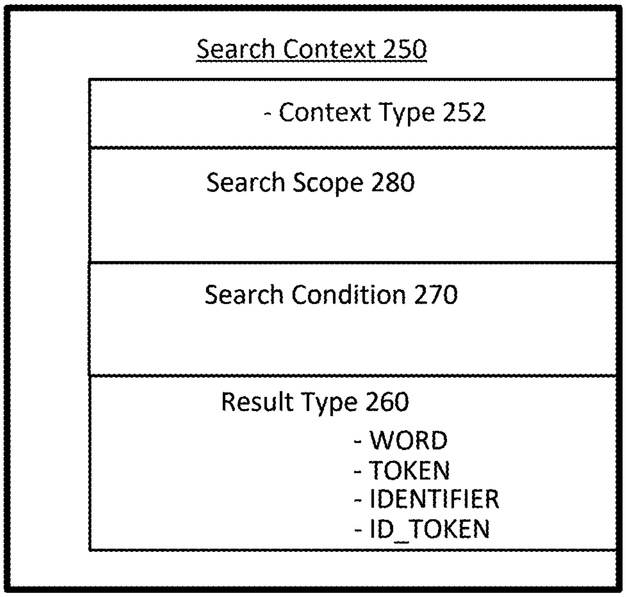
FIG. 2B illustrates an example search context generated by a search context module, in accordance with examples described herein.

FIG. 2B illustrates an example search context generated by a search context module, in accordance with examples described herein. As provided herein, the search context 250 includes the details of the search criteria and is generated by the search context module 110 based on a received search text 177. The search context module 110 generates the search context 250 to include a set of properties comprising a context type 252, a result type 260, a search condition 270, and a search scope 280. As described herein, the context type 252 comprises an initial filter for the search (e.g., indicating a specific client datastore, or can comprise a generic type).

The result type 260 can include the type of searchable result that the search output engine 115 uses to generate the final, modified search term 118. In examples, the result type 260 comprises an additional filter for the search applied by the search output engine 115. The result type 260 can comprise of a number of different options that include a 'WORD' option that filters for only the matched word. For example, if the search text includes 'Arc' in an address field of '37 Arcade Avenue', the 'WORD' option filter will only yield the word 'Arcade' of the encrypted form of '37 Arcade Avenue', which controls or limits the final search text length. The result type options can further include a 'TOKEN' option filter that filters for the entire search token. In the above example, the 'TOKEN' option filter would yield the entire encrypted term of '37 Arcade Avenue.'

In further examples, the result type options can further include an 'IDENTIFIER' option filter that filters for the identifier token of the entity. For example, if the identifier token comprises 'name' with the value 'John Smith', then 'IDENTIFIER' option filter will yield an output as the encrypted form of 'John Smith'. The result type options can further include an 'IDENTIFIER_TOKEN' option filter, which can hold both the identifier and the matched token together accordingly.

In various examples, the search context module 110 generates the search context 250 to include a search condition 270, which holds the real condition(s) used to match searchable data. A search condition holds the rules or the condition types which are used to apply the search context 250 to the searchable datastore 120. For example, the search condition 270 can comprise different types, such as 'equals', 'startsWith,' endsWith', regular expression, and negation. In accordance with examples, each word in a search text can comprise a different search token, and the relation between adjacent search tokens can comprise a joiner operator, such as a Boolean 'OR' or 'AND' operator, which can be specified as a property in the filter.

In further examples, the search context module 110 can implement a search condition parser that parses the search text 177 to derive the final search condition 270. In certain implementations, the search condition parser can vary according to the search context type 252. The search condition parser can derive the search condition 270 as 'Equals', 'StartsWith', regular expression, or an 'OR' condition. As further examples, single quotation marks on a single search term (e.g., 'John') can correspond to a 'StartsWith' search condition, single quotation marks surrounding double quotation marks on a single search term (e.g., '"John"') can correspond to an 'Equals' search condition, single quotation marks on multiple search terms (e.g., 'John Smith') can correspond to a 'StartsWith' search condition for each of the multiple search terms (e.g., 'John' and 'Smith'), single quotations on multiple search terms joined by an 'OR' operator (e.g., 'John OR Smith') can correspond to a search for entity records that contain data starting with John or Smith, single quotations on multiple search terms joined by an 'OR' operator in which one or more terms include double quotations (e.g., 'John OR "Smith"') can correspond to a search for entity records that contain data starting with "John" or matching the exact text for "Smith," and so on.

In various implementations, the search context module 110 can generate the search context 250 to include a search scope 280, which can restrict the search to specific record types or specific fields. In certain examples, the search context module 110 can implement a search scope parser, which can also vary with respect to the search context type 252 (e.g., as does the search condition parser). As an example, the search context module 110 can parse the search text 177 to derive the search scope 280, which can have a relative matcher or an exact matcher. For example, a scope of 'cu' can match entity records of both 'Customer' and 'Customer Address', whereas the scope of '"Customer"' can only match entity records of the type 'Customer'. In certain examples, a special scope term (e.g., 'SK') can designate a search scope that limits the search output to content encrypted by an entity corresponding to the special scope term (e.g., Stratokey encrypted content only). However, if no search scope 280 is present, the search output engine 115 executes a global search in the searchable datastore 120. As an example, search text including 'cu: John' will cause the search output engine 115 to search entity records whose entity type starts with 'cu', and search text including '"Customer": John' will cause the search output engine 115 to search entity records whose entity type is 'Customer' (e.g., the Customer group or bucket of the individual context-based datastores that comprise the searchable datastore 120).

In further examples, the search scope 280 can be hierarchical. For example, the search scope 280 can initially match the root scopes 204 of the searchable entity records 123, and then proceed to matching the searchable data tokens 210. In some examples, the search scope text may be separated from the search condition text with a special character, such as a colon. As provided herein, the search scope text varies with respect to the context type 252, and is therefore context type-specific. In still further examples, the search context can support searches with multi-level scopes, which can extend the search capabilities beyond the SaaS application. Specifically, the searchable utility system 100 can support multi-level scoping with token identifiers or fields that enable efficient search filtering.

As described herein, the final, modified search term 118 is generated by the search output engine 115 by applying the search context 250 on the searchable data store 120. Upon identifying or retrieving the matching entity record(s) in the searchable datastore 120, the search output engine 115 can build or otherwise generate the final search term 118 by rewriting the search text 177 with matched encrypted terms from the searchable entity records 123, and providing the final search term 118 to the SaaS application to perform the search. For example, the final search term 118 can comprise all of the search tokens and encrypted search tokens from the relevant searchable entity records 123 joined together (e.g., via a Boolean 'OR' operator).

Methodology

In the below description of FIGS. 3, 4, and 5, references may be made to reference characters representing like features as shown and described with respect to FIGS. 1, 2A, and 2B. The processes described with respect to the flow charts of FIGS. 3, 4, and 5 may be performed by the searchable utility system 100, and components therein, described with respect to FIG. 1. The steps described with respect to FIGS. 3, 4, 5 need not be performed in any particular order, and any step may precede, follow, or be performed in conjunction with any other step.

Figure 3:
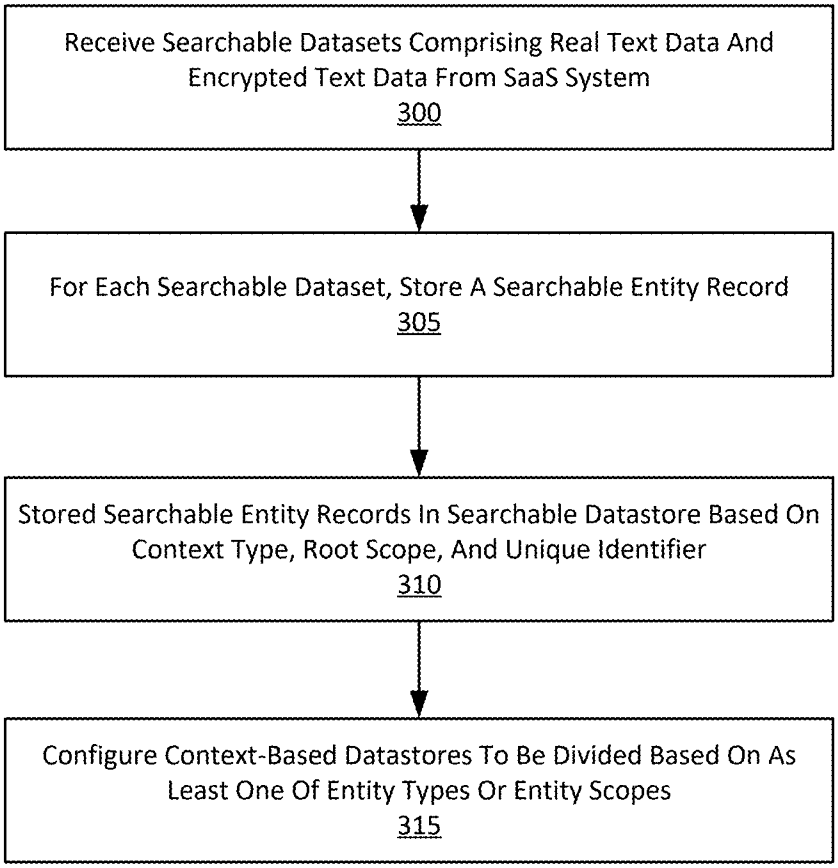
FIG. 3 is a flowchart describing an example method of generating a searchable entity record based on a plaintext term, in accordance with examples described herein.

FIG. 3 is a flowchart describing an example method of generating a searchable entity record 200 based on a plaintext term, in accordance with examples described herein. Referring to FIG. 3, a searchable datastore 120 can receive searchable data 133 from a SaaS system 150, where the searchable dataset 133 can comprise real text data and the encrypted equivalents (300). Alternatively, the searchable datastore 120 can receive transformation hints to convert the encrypted content to unencrypted form along with the encrypted content. For each searchable dataset 133, the searchable datastore 120 can obtain the context type, root scope, and unique identifier from the SaaS system 150 to store a searchable entity record 123 (305). As provided herein, the searchable entity record 123 must include a context type 202, root scope 204, and unique identifier 206, as well as searchable data tokens 210, optional generated tokens 220, and an identifier token 230.

In various examples, the searchable datastore 120 can store the searchable entity records 123 based on at least one of context type 202, root scope 204, and unique identifier 206 (310). Accordingly, the searchable datastore 120 can be virtually divided into individual datastores based on context type 202 (e.g., SaaS application context). The searchable datastore 120 can further configure each of these individual, context-based datastores to be divided into buckets or groupings of entity types and/or entity scopes (315). As such, each data bucket or grouping can comprise one entry for each unique identifier, such that when new data with an existing unique identifier is received at the searchable datastore 120, the new data can replace the old data having the same unique identifier.

Figure 4:
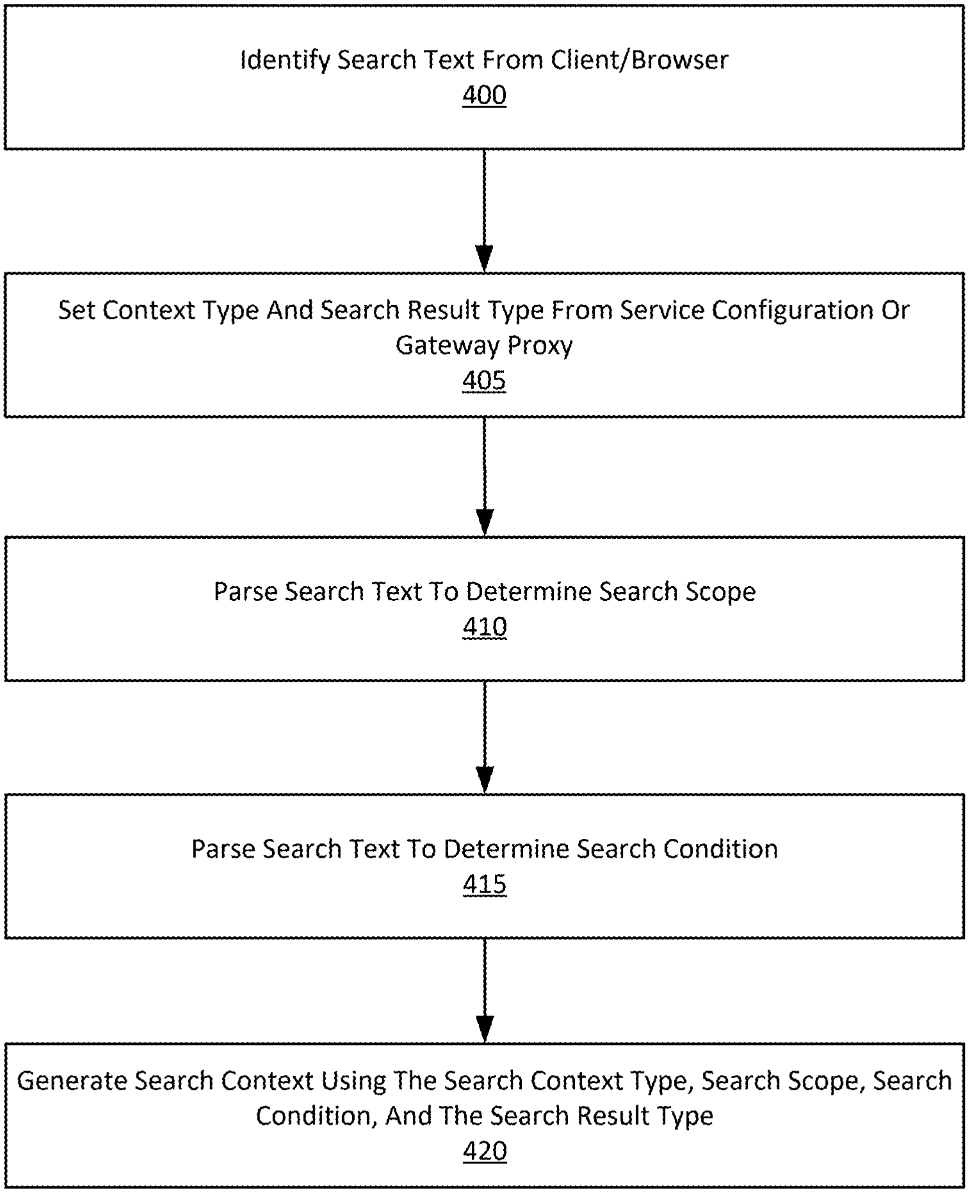
FIG. 4 is a flowchart describing an example method of generating a search context based on a received search request, in accordance with examples described herein.

FIG. 4 is a flowchart describing an example method of generating a search context 250 based on a received search request, in accordance with examples described herein. Referring to FIG. 4, the search context module 110 of the searchable utility system 100 can identify search text 177 from a client device 170 and/or browser of the client device 170 (400). In certain examples, the search context module 110 can set a context type and search result type from the service configuration (e.g., REST service configuration) or gateway proxy (405). The search context module 110 can further parse the search text 177 to determine the search scope (410). For example, the search context module 110 can execute a search scope parser to determine the search scope 280. As provided herein, the search scope parser can vary with respect to the search context type 252. As further provided herein, the search scope 280 restricts the search to specific record types or specific fields.

In various examples, the search context module 110 can execute a search condition parser to parse the search text 177 and determine the search condition (415). As provided herein, the search condition parser can also vary according to the search context type 252.

The search context module 110 may then generate the search context 112 using the search context type 252, the search scope 280, the search condition 270, and the search result type 260. As provided herein, the search output engine 115 can then apply the search context 112 on the searchable datastore 120.

Figure 5:
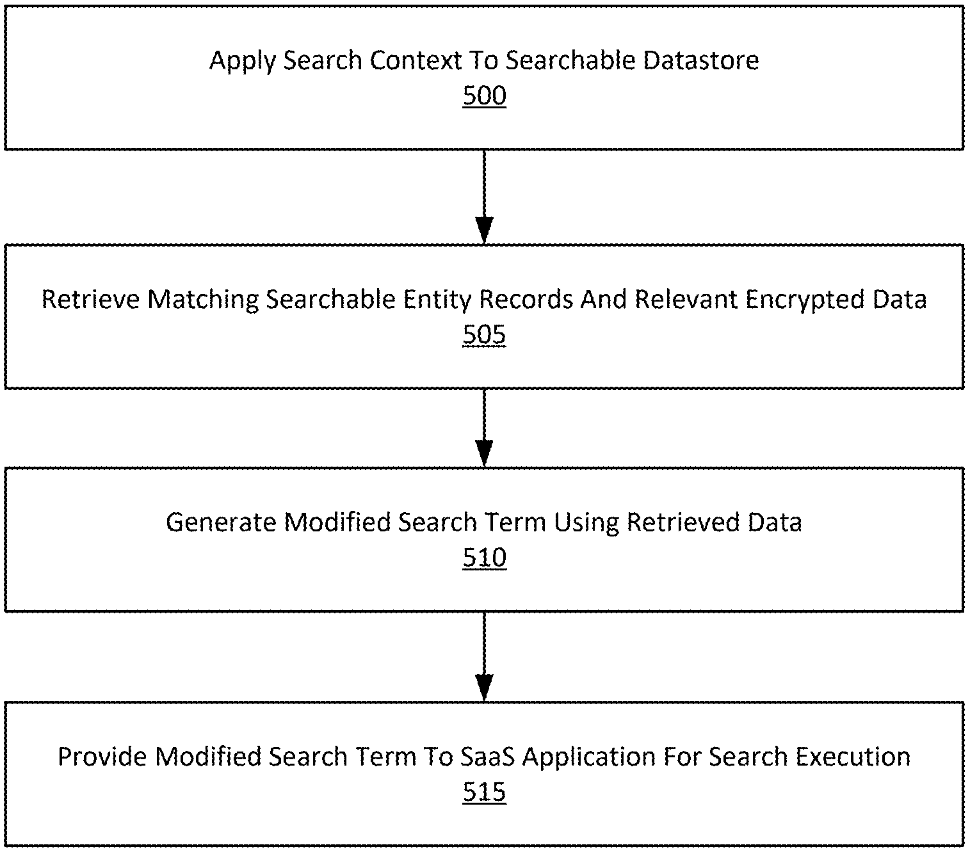
FIG. 5 is a flowchart describing an example method of executing a search on the searchable datastore based on a search context, in accordance with examples described herein.

FIG. 5 is a flowchart describing an example method of executing a search on the searchable datastore 120 based on a search context 112, in accordance with examples described herein. Referring to FIG. 5, the search output engine 115 can apply the search context 112 to the searchable datastore 120 (500). The search output engine 115 can further retrieve or otherwise identify the matching searchable entity records 123 based on the search context 112 and obtain the relevant encrypted data that corresponds to the search text 177 (505).

The search output engine 115 can then generate a modified search term 118 using the retrieved encrypted data (510). As provided herein, the modified search term 118 can comprise all the search tokens and encrypted search tokens—corresponding to the search text 177 and retrieved encrypted data from the searchable entity records 123—joined together with an operator (e.g., a Boolean 'OR' operator). The search output engine 115 may then provide or transmit the modified search term 118 to the SaaS application to enable the SaaS application (e.g., via a browser) to execute the search accordingly (515) (e.g., via a typical search engine).

Hardware Diagram

Figure 6:
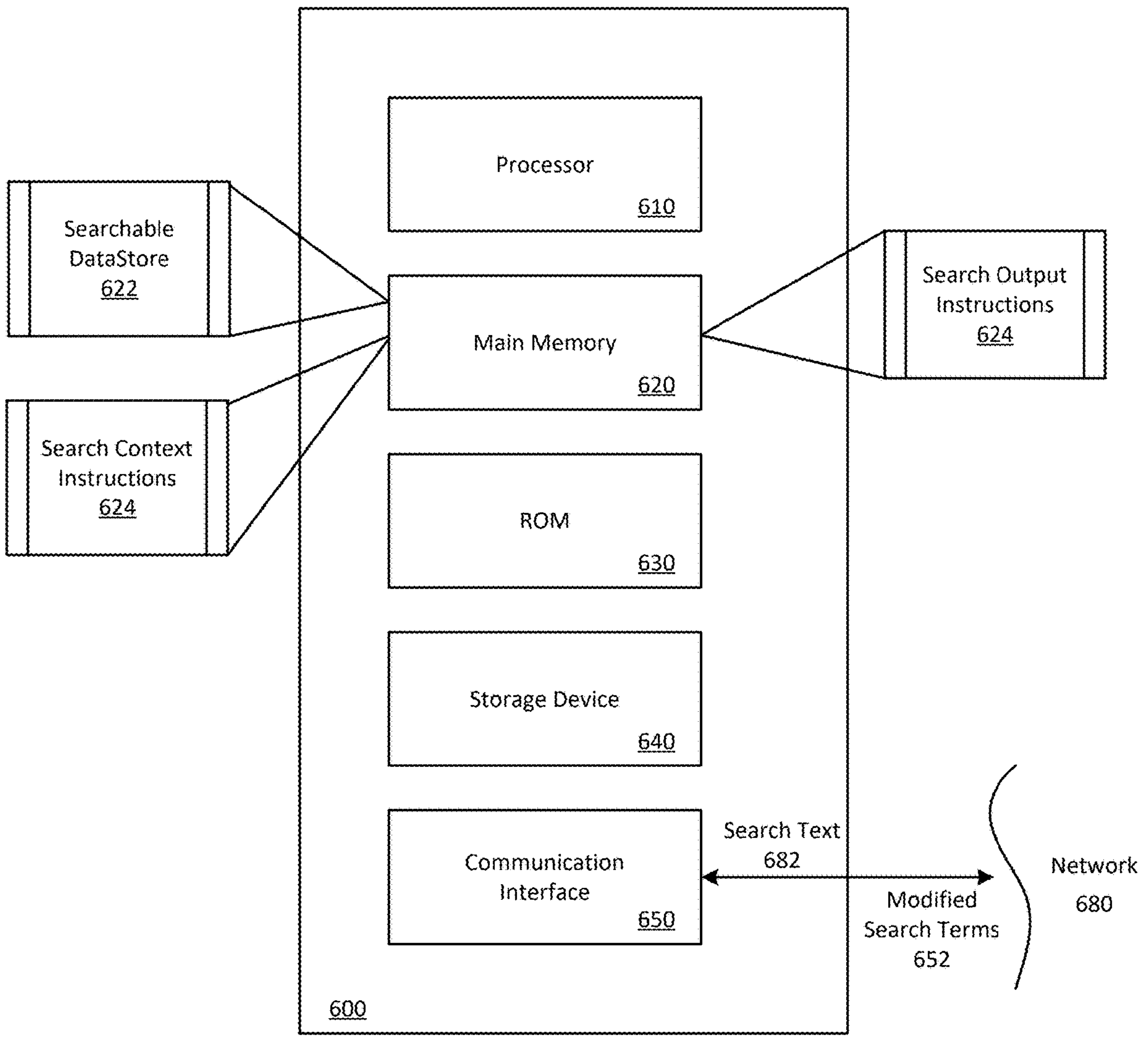
FIG. 6 is a block diagram that illustrates a computer system upon which examples described herein may be implemented.

FIG. 6 is a block diagram that illustrates a computer system 600 upon which examples described herein may be implemented. A computer system 600 can be implemented on, for example, a server or combination of servers. For example, the computer system 600 may be implemented as part of a searchable utility service, such as described in FIGS. 1 through 5. In the context of FIG. 1, the searchable utility system 100 may be implemented using a computer system 600 such as described by FIG. 6. The searchable utility system 100 may also be implemented using a combination of multiple computer systems 600 as described in connection with FIG. 6.

In one implementation, the computer system 600 includes processing resources 610, a main memory 620, a read-only memory (ROM) 630, a storage device 640, and a communication interface 650. The computer system 600 includes at least one processor 610 for processing information stored in the main memory 620, such as provided by a random-access memory (RAM) or other dynamic storage device, for storing information and instructions which are executable by the processor 610. The main memory 620 also may be used for storing temporary variables or other intermediate information during execution of instructions to be executed by the processor 610. The computer system 600 may also include the ROM 630 or other static storage device for storing static information and instructions for the processor 610. A storage device 640, such as a magnetic disk or optical disk, is provided for storing information and instructions.

The communication interface 650 enables the computer system 600 to communicate with one or more networks 680 (e.g., cellular network) through use of the network link (wireless or wired). Using the network link, the computer system 600 can communicate with one or more computing devices, one or more servers, and/or one or more self-driving vehicles. In accordance with examples, the computer system 600 search text 682 from client devices or a SaaS system. The main memory 620 can store a searchable datastore 622 in accordance with examples described throughout the present disclosure. The executable instructions stored in the memory 630 can include search context instructions 624, which the processor 610 executes to parse the search text 682 and generate a search context for retrieving encrypted data that corresponds to the given search text 682.

The executable instructions stored in the memory 620 can also include search output instructions 624, which the processor(s) 610 can execute to apply the search context to the searchable datastore 622 and generate a modified search term 652 to be provided to the SaaS application, which can execute the encryption content search accordingly.

Examples described herein are related to the use of the computer system 600 for implementing the techniques described herein. According to one example, those techniques are performed by the computer system 600 in response to the processor 610 executing one or more sequences of one or more instructions contained in the main memory 620. Such instructions may be read into the main memory 520 from another machine-readable medium, such as the storage device 640. Execution of the sequences of instructions contained in the main memory 620 causes the processor 610 to perform the process steps described herein. In alternative implementations, hard-wired circuitry may be used in place of or in combination with software instructions to implement examples described herein. Thus, the examples described are not limited to any specific combination of hardware circuitry and software.

It is contemplated for examples described herein to extend to individual elements and concepts described herein, independently of other concepts, ideas or systems, as well as for examples to include combinations of elements recited anywhere in this application. Although examples are described in detail herein with reference to the accompanying drawings, it is to be understood that the concepts are not limited to those precise examples. As such, many modifications and variations will be apparent to practitioners skilled in this art. Accordingly, it is intended that the scope of the concepts be defined by the following claims and their equivalents. Furthermore, it is contemplated that a particular feature described either individually or as part of an example can be combined with other individually described features, or parts of other examples, even if the other features and examples make no mentioned of the particular feature. Thus, the absence of describing combinations should not preclude claiming rights to such combinations.

What is claimed is:

1. A searchable utility system comprising:

a network communication interface;

one or more processors; and a memory storing instructions that, when executed by the one or more processors, cause the one or more processors to:

maintain, outside of a software-as-a-service (Saas) system storing encrypted data, a searchable data store comprising a plurality of searchable entity records, each searchable entity record comprising searchable data tokens each comprising token text comprising a non-encrypted value and search text comprising one or more corresponding encrypted values;

receive, over one or more networks, search text corresponding to a search request from a client device of a user to the SaaS system storing the encrypted data;

parse the search text to determine a set of one or more unencrypted search tokens;

obtain a set of encrypted search tokens by searching non-encrypted values stored in the searchable data store based on the set of one or more unencrypted search tokens to determine matching encrypted search tokens;

generate a modified search term comprising the matching encrypted search tokens; and provide, over the one or more networks, the modified search term to the client device of the user of the SaaS system to cause the SaaS system to execute a search using the modified search term.

2. The searchable utility system of claim 1, wherein maintaining the searchable data store comprises:

receiving, from the SaaS system, encrypted searchable data comprising encrypted values and corresponding transformer identifiers; and using the transformer identifiers to generate corresponding non-encrypted values.

3. The searchable utility system of claim 1, wherein the instructions, when executed by the one or more processors, cause the one or more processors to (i) utilize the search text to generate a search context, and (ii) apply the search context to the searchable entity records to generate the modified search term.

4. The searchable utility system of claim 3, wherein the searchable entity records each comprise a context type and a root scope, and wherein the one or more processors generate the search context to include a corresponding context type and a result type to be used to form the modified search term.

5. The searchable utility system of claim 1, wherein obtaining the set of encrypted search tokens by searching non-encrypted values stored in the searchable data store comprises searching the non-encrypted values based on a search condition comprising a wild card search.

6. The searchable utility system of claim 1, wherein generating the modified search term comprises rewriting the search text using matched encrypted terms in the searchable data store.

7. The searchable utility system of claim 1, wherein the instructions, when executed by the one or more processors, cause the one or more processors to:

receive a 'cancel searchable entity record request' from the SaaS system to delete a particular searchable entity record from the searchable data store; and in response to the 'cancel searchable entity record request', delete the particular searchable entity record from the searchable data store.

8. The searchable utility system of claim 1, wherein the modified search term comprises a plurality of search tokens comprising at least one unencrypted search token and at least one matching encrypted search token joined together by a Boolean 'OR' operator.

9. A non-transitory computer readable medium storing instructions that when executed by one or more processors, cause the one or more processors to:

maintain, outside of a software-as-a-service (Saas) system storing encrypted data, a searchable data store comprising a plurality of searchable entity records, each searchable entity record comprising searchable data tokens each comprising token text comprising a non-encrypted value and search text comprising one or more corresponding encrypted values;

receive, over one or more networks, search text corresponding to a search request from a client device of a user to the SaaS system storing the encrypted data;

parse the search text to determine a set of one or more unencrypted search tokens;

obtain a set of encrypted search tokens by searching non-encrypted values stored in the searchable data store based on the set of one or more unencrypted search tokens to determine matching encrypted search tokens;

generate a modified search term comprising the matching encrypted search tokens; and provide, over the one or more networks, the modified search term to the client device of the user of the SaaS system to cause the SaaS system to execute a search using the modified search term.

10. The non-transitory computer readable medium of claim 9, wherein maintaining the searchable data store comprises:

receiving, from the SaaS system, encrypted searchable data comprising encrypted values and corresponding transformer identifiers; and using the transformer identifiers to generate corresponding non-encrypted values.

11. The non-transitory computer readable medium of claim 10, wherein the instructions, when executed by the one or more processors, cause the one or more processors to (i) utilize the search text to generate a search context, and (ii) apply the search context to the searchable entity records to generate the modified search term.

12. The non-transitory computer readable medium of claim 11, wherein the searchable entity records each comprise a context type and a root scope, and wherein the one or more processors generate the search context to include a corresponding context type and a result type to be used to form the modified search term.

13. The non-transitory computer readable medium of claim 9, wherein obtaining the set of encrypted search tokens by searching non-encrypted values stored in the searchable data store comprises searching the non-encrypted values based on a search condition comprising a wild card search.

14. The non-transitory computer readable medium of claim 9, wherein generating the modified search term comprises rewriting the search text using matched encrypted terms in the searchable data store.

15. The non-transitory computer readable medium of claim 9, wherein the instructions, when executed by the one or more processors, cause the one or more processors to:

receive a 'cancel searchable entity record request' from the SaaS system to delete a particular searchable entity record from the searchable data store; and in response to the 'cancel searchable entity record request', delete the particular searchable entity record from the searchable data store.

16. The non-transitory computer readable medium of claim 9, wherein the modified search term comprises a plurality of search tokens comprising at least one unencrypted search token and at least one matching encrypted search token joined together by a Boolean 'OR' operator.

17. A computer-implemented method, comprising:

maintaining, outside of a software-as-a-service (Saas) system storing encrypted data, a searchable data store comprising a plurality of searchable entity records, each searchable entity record comprising searchable data tokens each comprising token text comprising a non-encrypted value and search text comprising one or more corresponding encrypted values;

receiving, over one or more networks, search text corresponding to a search request from a client device of a user to the SaaS system storing the encrypted data;

parsing the search text to determine a set of one or more unencrypted search tokens;

obtaining a set of encrypted search tokens by searching non-encrypted values stored in the searchable data store based on the set of one or more unencrypted search tokens to determine matching encrypted search tokens;

generating a modified search term comprising the matching encrypted search tokens; and providing, over the one or more networks, the modified search term to the client device of the user of the SaaS system to cause the SaaS system to execute a search using the modified search term.

18. The method of claim 17, wherein maintaining the searchable data store comprises:

receiving, from the SaaS system, encrypted searchable data comprising encrypted values and corresponding transformer identifiers; and using the transformer identifiers to generate corresponding non-encrypted values.

19. The method of claim 17, wherein obtaining the set of encrypted search tokens by searching non-encrypted values stored in the searchable data store comprises searching the non-encrypted values based on a search condition comprising a wild card search.

20. The method of claim 17, further comprising:

receiving a 'cancel searchable entity record request' from the SaaS system to delete a particular searchable entity record from the searchable data store; and in response to the 'cancel searchable entity record request', deleting the particular searchable entity record from the searchable data store.

* * * * *